United States Patent
Bessette et al.

(10) Patent No.: US 7,278,317 B2
(45) Date of Patent: Oct. 9, 2007

(54) PRESSURE MEASUREMENT

(75) Inventors: Tyler J. Bessette, Milford, CT (US); Donald D. McIntosh, Milford, CT (US)

(73) Assignee: Ashcroft, Inc., Stratford, CT (US)

(*) Notice: Subject to any disclaimer, the term of this patent is extended or adjusted under 35 U.S.C. 154(b) by 0 days.

(21) Appl. No.: 11/391,860

(22) Filed: Mar. 29, 2006

(65) Prior Publication Data
US 2006/0278003 A1 Dec. 14, 2006

Related U.S. Application Data

(63) Continuation of application No. 10/706,822, filed on Nov. 12, 2003, now Pat. No. 7,047,811.

(60) Provisional application No. 60/448,007, filed on Feb. 18, 2003.

(51) Int. Cl.
*G01L 19/04* (2006.01)
(52) U.S. Cl. .................... 73/708; 73/715; 73/717; 73/753
(58) Field of Classification Search .......... 73/700–756; 374/201–207; 138/26–31
See application file for complete search history.

(56) References Cited

U.S. PATENT DOCUMENTS

| | | | |
|---|---|---|---|
| 2,216,374 A | 10/1940 | Martin | |
| 3,712,138 A | 1/1973 | Alinari | |
| 4,111,056 A | 9/1978 | Mastromatteo | |
| 4,192,192 A | 3/1980 | Schnell | |
| 4,221,134 A | 9/1980 | Ekstrom, Jr. | |
| 4,338,833 A * | 7/1982 | Schleffendorf | 76/103 |
| 4,507,972 A * | 4/1985 | Morita | 73/708 |
| 4,641,533 A | 2/1987 | Mueller et al. | |
| 4,722,228 A | 2/1988 | Awa et al. | |
| 4,777,827 A | 10/1988 | Brodetsky | |
| 5,111,698 A | 5/1992 | Banholzer et al. | |
| 5,187,985 A | 2/1993 | Nelson | |
| 5,286,931 A | 2/1994 | Murphy et al. | |
| 5,349,866 A | 9/1994 | Huang | |
| 5,652,391 A | 7/1997 | Kingsford et al. | |

FOREIGN PATENT DOCUMENTS

| | | |
|---|---|---|
| EP | 0 764 839 A1 | 3/1997 |
| EP | 0764839 | 3/1997 |
| JP | 02262032 A * | 10/1990 |

OTHER PUBLICATIONS

PCT International Search Report, PCT/US2004/001494, Sep. 1, 2004, pp. 1-3.

* cited by examiner

*Primary Examiner*—Edward Lefkowitz
*Assistant Examiner*—Jermaine Jenkins
(74) *Attorney, Agent, or Firm*—McCarter & English, LLP

(57) ABSTRACT

Pressure measurement may be achieved by using a pressure-conveyance media that responds to externally applied pressure to convey pressure to a pressure sensor. With the conveyance of pressure, the pressure measurement may be accomplished by determining a pressure of the pressure-conveyance media, determining a temperature of the pressure-conveyance media, and determining pressure externally exerted on the pressure-conveyance media based one the pressure of the pressure-conveyance media and the temperature of the pressure-conveyance media.

12 Claims, 3 Drawing Sheets

PRESSURE MEASUREMENT

RELATED APPLICATIONS

This application is a continuation of U.S. patent application Ser. No. 10/706,822, filed on Nov. 12, 2003, now U.S. Pat. No. 7,047,811 and entitled "Pressure Measurement", which claims the benefit of U.S. Provisional Application No. 60/448,007, filed on Feb. 18, 2003, and entitled "Temperature Compensating Pressure Gauge".

TECHNICAL FIELD

This description relates to measurement, and more particularly to systems and techniques for pressure measurement.

BACKGROUND

Pressure gauges are useful in a myriad of different environments for commercial and industrial applications. Typically, pressure gauges measure pressure and provide an indication of the value. Pressure values are usually displayed in analog form (e.g., by a pointer) or in digital form (e.g., by an electronic readout). Gauges displaying values in analog form often include a mechanical pressure transducer, such as a Bourdon tube, that displaces a predictable amount in response to the pressure to which the transducer is exposed. The displacement is translated via a movement to a rotatable pointer that moves opposite a dial of calibrated pressure values. Gauges displaying values in digital form often include an electronic pressure transducer, such as a piezo-type sensor, that generates an electrical signal in response to the pressure to which the transducer is exposed. The electrical signal is then converted to a symbol that is presented on a display.

SUMMARY

Pressure measurement may be achieved by using a pressure-conveyance media that responds to externally applied pressure by conveying pressure to a pressure sensor. The measurement of the pressure sensor may be compensated based on the temperature of the pressure-conveyance media.

In one general aspect, a system for measuring pressure includes a coupling device, a pressure conveyance media, a pressure sensor, a temperature sensor, and a processor. The pressure conveyance media, which may, for example, be glycerin, is responsive to external pressure on the coupling device, and the pressure sensor, which may, for example, be a piezo-type sensor, is operable to sense a pressure of the pressure-conveyance media. The temperature sensor is operable to sense a temperature of the pressure-conveyance media. The temperature sensor may, for example, be a resistive temperature device. The processor is operable to determine external pressure on the coupling device based on the pressure of the pressure-conveyance media and the temperature of the pressure-conveyance media.

In particular implementations, the coupling device is a seal in which the pressure-conveyance media is at least partially disposed. Furthermore, the seal is adapted to couple to a process and to mechanically respond to pressure exerted by a process media. The seal may include a diaphragm that is operable to mechanically respond to pressure exerted by the process media and to convey the response to the pressure-conveyance media.

In certain implementations, the processor is further operable to generate a signal representing the determined pressure. In particular implementations, a visual output device is operable to display an indicia representing the determined external pressure based on the generated signal.

Determining external pressure on the coupling device based on the pressure of the pressure-conveyance media and the temperature of the pressure-conveyance media may include compensating the pressure of the pressure-conveyance media based on the temperature of the pressure-conveyance media and determining external pressure on the coupling device based on the compensated pressure of the pressure-conveyance media.

In another general aspect, a system for measuring pressure includes a coupling device, a pressure-conveyance media, a pressure sensor, a temperature sensor, and a processor. The coupling device includes a diaphragm that is mechanically responsive to external pressure, and the pressure-conveyance media is disposed at least in part in the coupling device and is responsive to the diaphragm. The pressure sensor is positioned to sense a pressure of the pressure-conveyance media, and the temperature sensor is positioned to sense a temperature of the pressure-conveyance media. The processor is operable to determine external pressure on the diaphragm based on the pressure of the pressure-conveyance media and the temperature of the pressure-conveyance media.

In an additional general aspect, a system for measuring pressure includes a pressure sensor, a coupling device, a pressure-conveyance media, a temperature sensor, and a processor. The coupling device is operable to link the pressure sensor to a process media. The pressure-conveyance media is at least partially disposed in the coupling device and is operable to convey pressure changes of the process media to the pressure sensor. The temperature sensor is operable to sense a temperature of the pressure-conveyance media, and the processor is operable to determine a pressure of the process media based on the pressure of the pressure-conveyance media and the temperature of the pressure-conveyance media.

In another general aspect, a method for pressure measurement includes determining a pressure of a pressure-conveyance media and determining a temperature of the pressure-conveyance media. The method also includes determining pressure externally exerted on the pressure-conveyance media by a process media based on the pressure of the pressure-conveyance media and the temperature of the pressure-conveyance media.

Determining pressure externally exerted on the pressure-conveyance media by a process media based on the pressure of the pressure-conveyance media and the temperature of the pressure-conveyance media may include compensating at least one of the pressures for the temperature of the pressure conveyance media. Furthermore, determining pressure externally exerted on the pressure-conveyance media by a process media based on the pressure of the pressure conveyance-media and the temperature of the pressure-conveyance media may include compensating the pressure of the pressure-conveyance media based on the temperature of the pressure-conveyance media and determining the externally exerted pressure using the compensated pressure.

Particular implementations may include determining an indicia representing the determined external pressure, the indicia for display by an output device. Some of these implementations may include displaying the indicia.

Determining a pressure of a pressure-conveyance media may include determining the amplitude of a signal representing the pressure of the pressure-conveyance media. Determining a temperature of the pressure-conveyance media may include determining the amplitude of a signal representing the temperature of the pressure-conveyance media.

Particular implementations may include determining whether it is time to update a visual output device.

In another general aspect, a system for pressure measurement includes means for determining a pressure of a pressure-conveyance media, means for determining a temperature of the pressure-conveyance media, means for determining pressure externally exerted on the pressure-conveyance media, and means for compensating at least one of the pressures for the temperature of the pressure-conveyance media.

Particular implementations may include means for determining an indicia representing the determined external pressure, the indicia for display by an output device. Some of these implementations may include means for displaying the indicia.

Certain implementations may include means for determining whether it is time to update a visual output device.

In yet another general aspect, a system for measuring pressure includes a seal having a diaphragm that is operable to mechanically respond to externally-applied pressure of a process media and a pressure-conveyance media at least partially disposed in the seal, the pressure of the pressure-conveyance media responsive to the mechanical response of the diaphragm. The system also includes a strain-gauge pressure sensor coupled to the pressure-conveyance media and operable to sense a pressure of the pressure-conveyance media and to generate a signal representative thereof. The system additionally includes a thermocouple temperature sensor coupled to the pressure-conveyance media and operable to sense a temperature of the pressure-conveyance media and to generate a signal representative thereof. The system further includes a microprocessor coupled to the pressure sensor and the temperature sensor. The microprocessor is operable to determine the pressure of the pressure-conveyance media based on the signal generated by the pressure sensor, to determine the temperature of the pressure-conveyance media based on the signal generated by the temperature sensor, and to compensate the pressure of the pressure-conveyance media based on the temperature of the pressure-conveyance media. The microprocessor is further operable to use the compensated pressure of the pressure-conveyance media to determine the pressure exerted externally on the diaphragm by the process media, to determine an indicia representing the pressure exerted externally on the diaphragm by the process media, to generate a signal representing the indicia, and to generate a signal representing the pressure exerted externally on the diaphragm by the process media. The system also includes a visual output device coupled to the processor, the visual output device operable to display the indicia representing the pressure externally exerted on the diaphragm by the process media based on the signal generated by the processor.

The systems and techniques briefly described above have a variety of features. For example, by interposing the pressure-conveyance media between the process media and the pressure sensor, the pressure sensor may be insulated, at least in part, from the process media. Thus, the process media has less chance of adversely affecting the pressure sensor. As another example, by measuring the temperature of the pressure-conveyance media, the pressure of the pressure-conveyance media may be corrected for errors due to its temperature. Sensing the temperature of the pressure-conveyance media also allows for compensating for other effects of the pressure-conveyance media temperature. Different implementations, however, may contain none, one, some, or all of these features and/or additional features.

The details of one or more implementations are set forth in the accompanying drawings and the description below. Other features of particular implementations will be apparent from the description and drawings, and from the claims.

BRIEF DESCRIPTION OF DRAWINGS

Like reference symbols in the various drawings indicate like elements.

DETAILED DESCRIPTION

The accuracy of pressure measurement may be improved by compensating for environmental variables that affect pressure measurement systems and techniques. In particular implementations, this may be accomplished by compensating for the temperature of a pressure-conveyance media that acts to insulate part of a pressure measurement system from a process media for which the pressure is to be measured. The compensation may be applied to the pressure of the pressure conveyance media, to the pressure of the process media, or otherwise. The temperature of the pressure-conveyance media may also be used to correct other errors.

Figure 1:
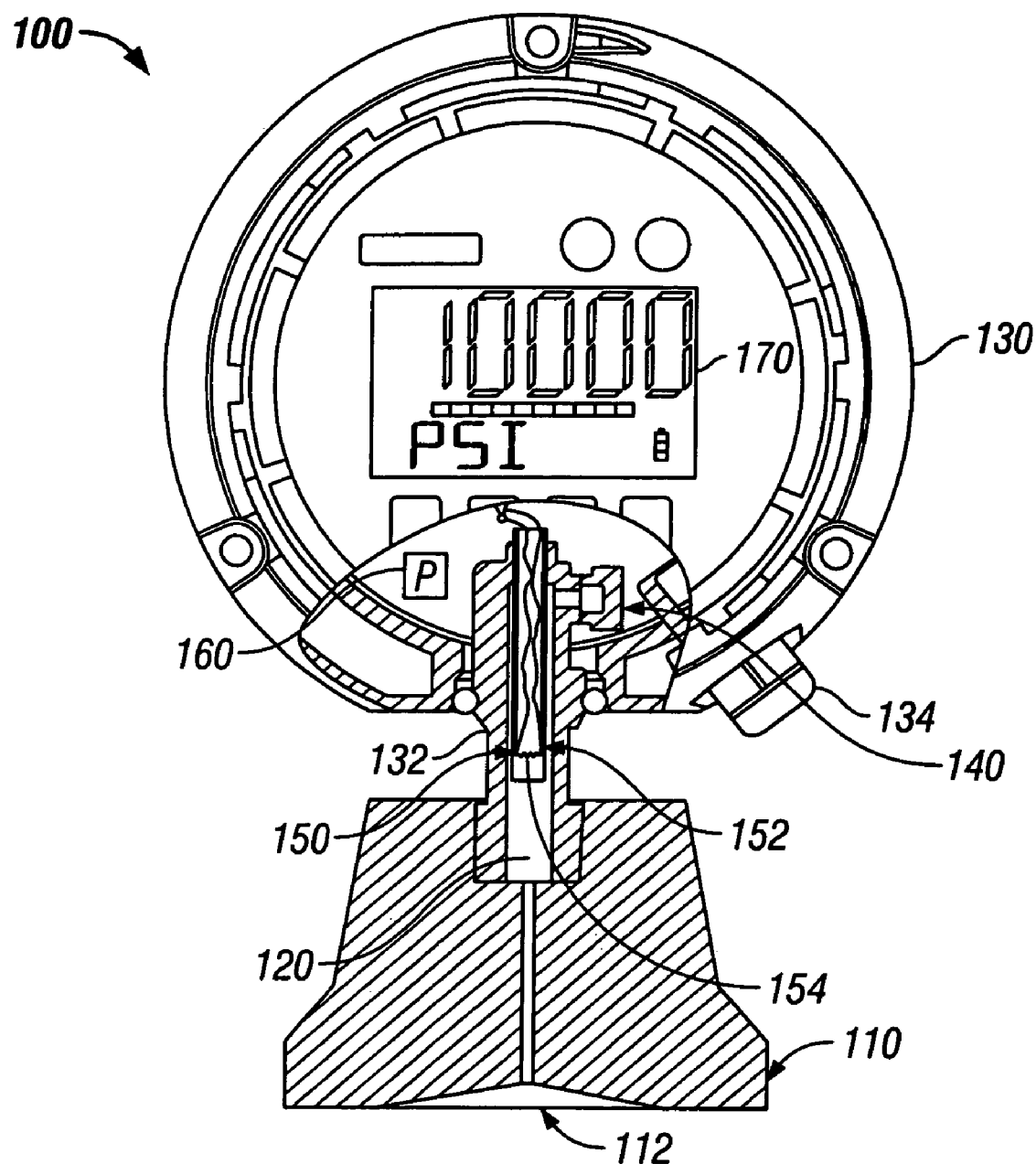
FIG. 1 is a partially-sectioned frontal view of an example system for pressure measurement.

FIG. 1 illustrates a system 100 for pressure measurement. System 100 includes a coupling device 110, a pressure-conveyance media 120, a housing 130, a pressure sensor 140, a temperature sensor 150, a processor 160, and a visual output device 170. Coupling device 110 is operable to couple system 100 to a process having a media for which the pressure is to be measured and to relay pressure of the process media to pressure-conveyance media 120. The process media may be a liquid, a gas, or a combination thereof. Pressure sensor 140 and temperature sensor 150 are operable to sense a pressure of pressure-conveyance media 120 and a temperature of pressure-conveyance media 120, respectively, and housing 130 supports and protects pressure sensor 140 and temperature sensor 150. Housing 130 also supports and protects processor 160 and visual output device 170. Processor 160 receives signals indicative of pressure and temperature from pressure sensor 140 and temperature sensor 150, respectively, and determines the pressure exerted by the process media on coupling device 110. Output device 170 then displays an indicia representing the pressure exerted by the process media.

In more detail, coupling device 110 is a sanitary-type seal in the illustrated implementation and includes a diaphragm 112 that deforms in response to pressure exerted by the process media. The deformation of diaphragm 112 due to the external pressure affects the pressure of pressure-conveyance media 120. Coupling device 110 may be of any appropriate size for coupling system 100 to the process. Furthermore, coupling device 110 may be composed of stainless steel, plastic, rubber, composite, and/or any other appropriate material. In general, coupling device 110 may be any appropriate apparatus for coupling a pressure measurement system to a system having a substance for which pressure is to be measured and for communicating the substance's pressure to a pressure-conveyance media.

Pressure-conveyance media 120 may be composed of glycerin, silicone, or any other appropriate fluid for conveying pressure to pressure sensor 140. As illustrated for system 100, pressure-conveyance media 120 is distributed between coupling device 110 and housing 130. In other implementations, however, the pressure-conveyance media may be entirely contained in coupling device 110 or in housing 130.

Housing 130 includes a socket 132 that couples to coupling device 110 and receives a portion of pressure-conveyance media 120. Socket 132 may be coupled to coupling device 110 and/or housing 130 by welding, threading, or any other appropriate technique. Housing 130 also includes an electrical coupling 134, through which signals may be sent to and/or received from a remote site, such as a central monitoring facility. Electrical coupling 134 may be a Heyco fitting or any other appropriate electrical coupling apparatus. Additionally, as mentioned previously, housing 130 supports and protects pressure sensor 140, temperature sensor 150, processor 160, and visual output device 170. Housing 130 may be composed of plastic, composite, metal, or any other appropriate material. In general, housing 130 may have any appropriate shape and/or composition for coupling to coupling device 110 and for supporting and protecting the pressure sensor and the temperature sensor.

Pressure sensor 140 is coupled to socket 132 of housing 130 to sense a pressure of pressure-conveyance media 120. In response to the sensed pressure, pressure sensor 130 generates an electrical signal. In particular implementations, pressure sensor 140 may be a capacitive-type pressure sensor, a piezo-type pressure sensor, or a strain-gauge-type pressure sensor. In general, pressure sensor 140 may be any appropriate type of pressure-to-electrical transducer.

Temperature sensor 150 is also coupled to socket 132, but senses a temperature of pressure-conveyance media 120 and generates an electrical signal in response. As illustrated, temperature sensor 150 includes a temperature probe 152 that is disposed in pressure-conveyance media 120. Probe 152 has a tubular shape and may be composed of stainless steel or any other appropriate material. In other implementations, probe 152 may have any other appropriate shape. Probe 152 conducts temperature to a sensing element 154, which may, for example, be a resistive temperature device or a thermocouple. Sensing element 154 generates an electrical signal in response to the sensed temperature. Temperature sensor 150 may be located in the center of socket 132, near pressure sensor 140, or at any other appropriate location. Temperature sensor 150 may, in general, be any appropriate type of temperature-to-electrical transducer.

Processor 160 is coupled to pressure sensor 140 and temperature sensor 150. Due to this coupling, processor 160 receives electrical signals representing the pressure and the temperature of pressure-conveyance media 130. Processor 160 uses these signal to determine the pressure exerted on diaphragm 112 by the process media. In making this determination, processor 160 may determine the pressure of pressure-conveyance media 120 based on the signal representing the pressure of the pressure-conveyance media, compensate the determined pressure for the temperature of the pressure-conveyance media based on the signal representing the temperature of the pressure-conveyance media, and determine the pressure exerted on the diaphragm based on the compensated pressure. Processor 160 also determines an indicia representing the pressure on the diaphragm and generates a signal representing the indicia.

Processor 160 may be an analog processor, a microprocessor, a microcontroller, a field programmable gate array (FPGA), or any other appropriate device for manipulating information in a logical manner. If processor 160 is a microprocessor or a microcontroller, it may have logical instructions that determine its operation stored in associated memory, which may include random access memory (RAM), read-only memory (ROM), compact-disk read-only memory (CD-ROM), and/or any other appropriate device for storing information.

Visual output device 170 is coupled to processor 160 and receives the signal representing the indicia. Visual output device 170 may then display the indicia. Visual output device 170 may be a liquid crystal display (LCD), light emitting diode (LED) display, or any other appropriate apparatus for displaying information.

System 100 has a variety of features. For example, by placing the pressure-conveyance media between the process media and the pressure sensor, the system allows the pressure sensor to be insulated, at least in part, from the process media. Thus, the process media has less chance of adversely affecting the pressure sensor, and possibly other components. As another example, by measuring the temperature of the pressure-conveyance media, the system allows for correction of errors due to the temperature of the pressure-conveyance media. For instance, if the pressure-conveyance media is warmer during operation than when the system was calibrated, the pressure of the process media indicated by the pressure of the pressure-conveyance media would probably be higher than the actual pressure of the process media, due to the thermal expansion of the pressure-conveyance media. Sensing the temperature of the pressure-conveyance media, however, allows for compensating for the effects of the pressure-conveyance media temperature.

Particular implementations may include additional components. For example, a temperature sensor may be used to measure the temperature of the ambient air. This temperature may be used to correct errors in the pressure sensor, which may be sensitive to temperature. The temperature of the ambient air may be used alone or in combination with the temperature of the pressure-conveyance media to correct errors of the pressure measurement sensor.

Certain implementations may include fewer components. For example, the visual output device may be eliminated if the system is to send electrical signals representing the diaphragm pressure to a remote site, such as a central monitoring facility. In these implementations, which may use wire and/or wireless techniques, system 100 may act as a pressure-to-electrical transducer or a transmitter for a larger system. In other implementations, however, the visual output device may be retained to display pressure readings locally while still sending the signals to the remote site. As another example, the processor may be eliminated. This could occur, for example, if a remote site is responsible for the pressure computations.

Figure 2:
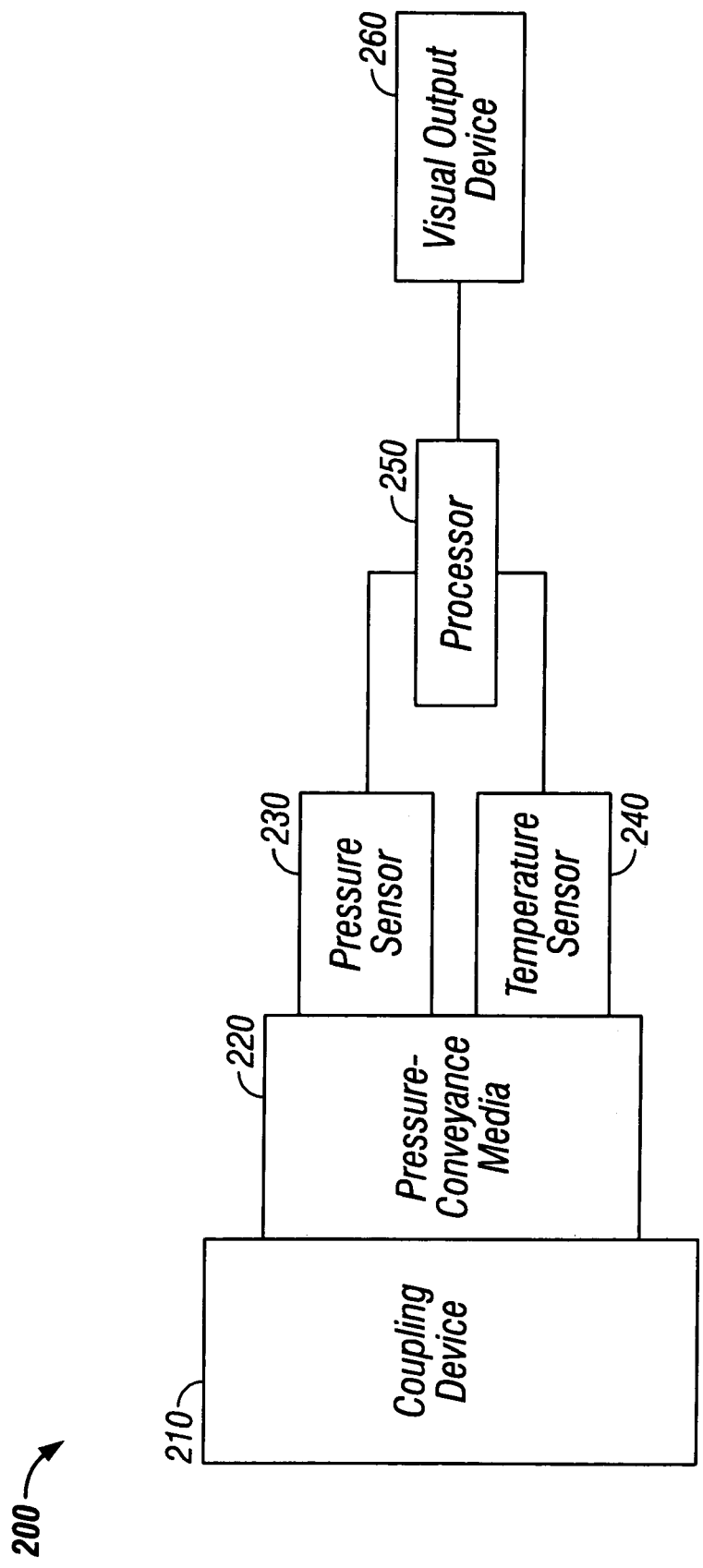
FIG. 2 is a block diagram illustrating a system for pressure measurement.

FIG. 2 illustrates a system 200 for pressure measurement. As illustrated, system 200 includes a coupling device 210, a pressure-conveyance media 220, a pressure sensor 230, a temperature sensor 240, a processor 250, and a visual output device 260.

Coupling device 210 may be any appropriate device for coupling pressure measurement system 200 to a system having a substance for which pressure is to be measured and for communicating the substance's pressure to pressure-conveyance media 220. Pressure-conveyance media 220 may be any appropriate substance for applying pressure to pressure sensor 230 in response to pressure received from coupling device 210. Pressure sensor 230 may be any appropriate apparatus for sensing a pressure of media 220 and converting the pressure into an electrical signal. Temperature sensor 240, in turn, may be any appropriate apparatus for sensing a temperature of media 220 and converting the temperature into an electrical signal. Pressure sensor 230 and temperature sensor 240 are coupled to processor 250 so that their signals may be conveyed thereto. Processor 250 is also coupled to visual output device 260, so that the output device may display information from the processor.

In one mode of operation, coupling device 210 has pressure exerted on it by a process media, which may or may not be in direct contact with coupling device 210. In response to the exerted pressure, the coupling device communicates pressure to pressure-conveyance media 220, altering its pressure. Pressure sensor 230 detects a pressure of media 220 and generates a signal representative of the pressure. Contemporaneously, temperature sensor 240 detects a temperature of media 220 and generates a signal representative of the temperature. Based on the signal from pressure sensor 230 and the signal from temperature sensor 240, processor 250 determines the pressure exerted on coupling device 210 by the process media. In doing so, processor 250 may determine the pressure and temperature of media 220 based on the signals, use the temperature to compensate the pressure of media 220, and determine the pressure exerted by the process media on media 220 based on the compensated pressure of media 220. After determining the pressure exerted by the process media, processor 250 generates a signal representing the pressure. The signal is received by visual output device 260, which displays an indicia of the pressure (e.g., a number).

Although FIG. 2 illustrates a system for pressure measurement, other systems for pressure measurement may have fewer, additional, and/or a different arrangement of components. For example, the temperature sensor may be partially or totally immersed in the pressure-conveyance media. As another example, analog-to-digital converters, amplifiers, and/or other signaling conditioning devices may be between the temperature sensor and the processor and/or the pressure sensor and the processor. Similar signaling conditioning devices may be between the processor and the visual output device. As a further example, a visual output device may not be used. In these situations, processor 250 may store the pressures determined to be exerted on the pressure-conveyance media, generate signals representing the pressures and send them to a remote site, use the pressures as input to other operations, or perform any other appropriate operation with the determined pressures. Note that processor 250 may also perform these operations if a visual output device is present.

Figure 3:
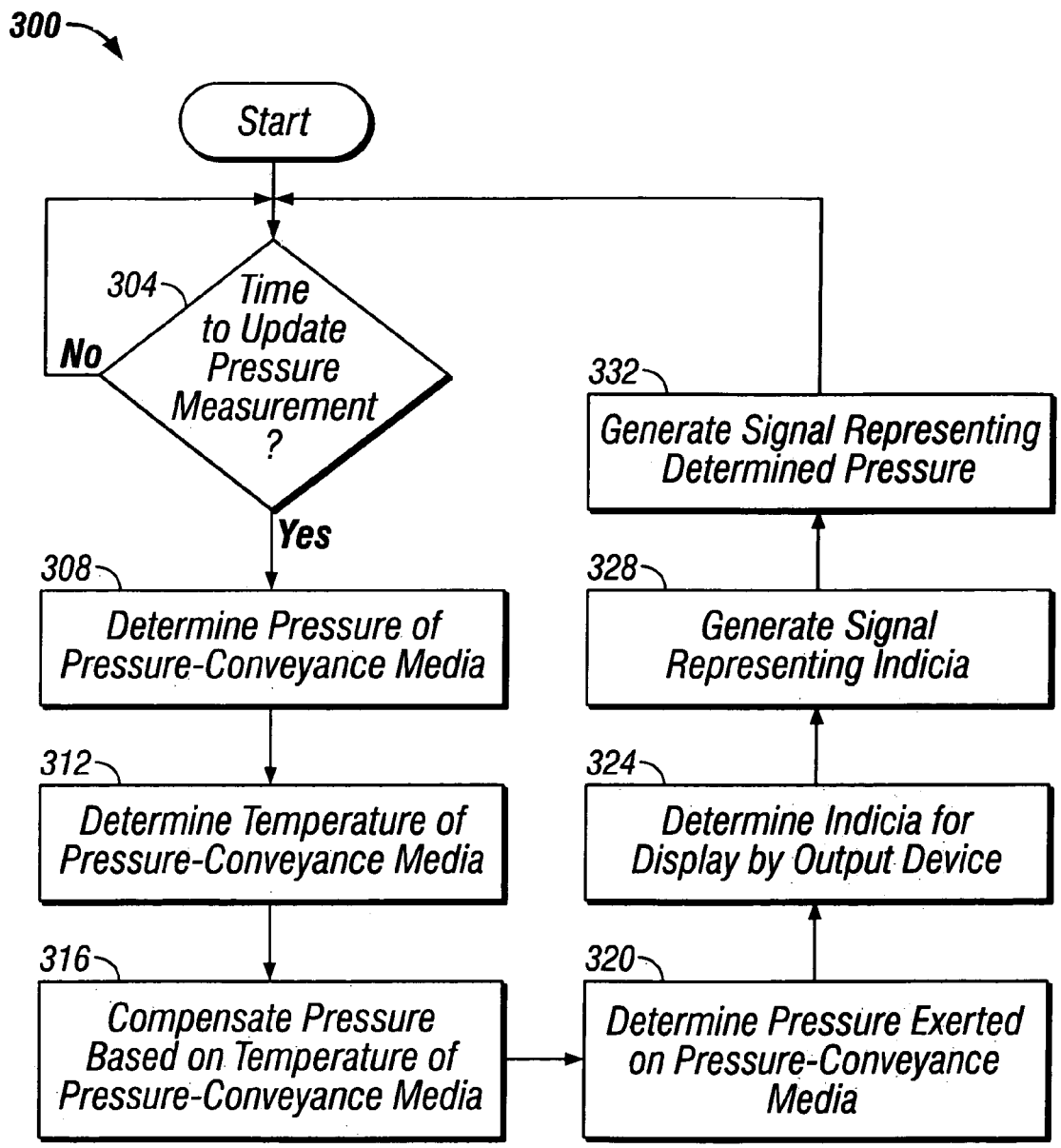
FIG. 3 is a flow chart illustrating a process for pressure measurement.

FIG. 3 is a flow chart illustrating a process 300 for pressure measurement. Process 300 may be implemented by a pressure measurement system similar to system 100 in FIG. 1; other types of pressure measurement systems may also implement the process.

The process begins with determining whether it is time to update a pressure measurement (decision block 304). Determining whether it is time to update a pressure measurement may be accomplished by determining that a certain amount of time has elapsed, by determining that a signal representing pressure has been received, by receiving a command for an updated pressure measurement, or by any other appropriate technique.

If it is time to update a pressure measurement, the process calls for determining a pressure of a pressure-conveyance media (function block 308), the pressure of the pressure-conveyance media being related to the pressure measurement to be updated. Determining a pressure of the pressure-conveyance media may be accomplished by receiving a signal representing the pressure of the pressure-conveyance media and converting the amplitude of the signal into a pressure by an equation or table look-up. Note that several signals regarding the pressure of the pressure-conveyance media may be received. The process may include examining the most recent signal, an average of the signals, or any other appropriate signal or combination of the signals.

The process also calls for determining a temperature of the pressure-conveyance media (function block 312). Determining a temperature of the pressure-conveyance media may be accomplished by receiving a signal representing the temperature of the pressure-conveyance media and converting the amplitude of the signal into a temperature by an equation or table look-up. Note that several signals regarding the temperature of the pressure-conveyance media may be received. The process may include examining the most recent signal, an average of the signals, or any other appropriate signal or combination of the signals.

The process additionally calls for compensating the pressure based on the temperature of the pressure-conveyance media (function block 316). Compensating the pressure may be performed by using the temperature of the pressure-conveyance media in an equation or table look-up, the output of which is a compensated pressure.

The process also calls for determining the pressure exerted on the pressure-conveyance media (function block 320), the pressure exerted on the pressure-conveyance media being the pressure to be measured. Determining the pressure exerted on the pressure-conveyance media may be accomplished by analyzing the compensated pressure of the pressure-conveyance media using an equation or table look-up.

The process continues with determining an indicia for display by a visual output device (function block 324), the indicia representing the pressure determined to be exerted on the pressure-conveyance media. The indicia may, for example, be a number. Note that the indicia may be the same as a presently displayed indicia if the pressure exerted on the pressure-conveyance media has not changed.

The process also calls for generating a signal representing the indicia (function block 328). The signal may then be sent to a visual output device, which may convert the signal into a visual display of the indicia.

The process additionally calls for generating a signal representing the determined pressure (function block 332). The signal may be sent a remote site, such as a monitoring facility, for storage and/or processing of the pressure measurement.

The process then calls for again determining whether it is time to update a pressure measurement (decision block 304).

Although FIG. 3 illustrates a process for pressure measurement, other pressure measurement processes may have fewer, additional, and/or a different arrangement of operations. For example, the temperature of the pressure-conveyance media may be determined before or simultaneously with determining a pressure of the pressure-conveyance media. As another example, the pressure exerted on the pressure-conveyance media may be continually determined without regard to whether it is time to update a pressure measurement. As a further example, compensating pressure based on the temperature of the pressure-conveyance media may be accomplished for the pressure determined to be exerted on the pressure-conveyance media. As an additional example, the process may include updating the displayed indicia on the visual output device. An a further example, one or both of the generated signals may be eliminated.

A number of implementations have been described, and various alternatives have been explained and/or mentioned. Furthermore, numerous modifications may be made without departing from the spirit and scope of the implementations. Accordingly, the invention is to be measured by the scope of the following claims.

What is claimed is:

1. A system for measuring pressure, the system comprising:
   a seal comprising a diaphragm that is operable to mechanically respond to externally-applied pressure of a process media;
   a pressure-conveyance media at least partially disposed in the seal, the pressure of the pressure-conveyance media responsive to the mechanical response of the diaphragm;
   an pressure sensor coupled to the pressure-conveyance media and operable to sense a pressure of the pressure-conveyance media and to generate a signal representative thereof;
   a temperature sensor coupled to the pressure-conveyance media and operable to sense a temperature of the pressure-conveyance media and to generate a signal representative thereof;
   a microprocessor coupled to the pressure sensor and the temperature sensor, the microprocessor operable to:
      determine the pressure of the pressure-conveyance media based on the signal generated by the pressure sensor,
      determine the temperature of the pressure-conveyance media based on the signal generated by the temperature sensor,
      compensate the pressure of the pressure-conveyance media based on the temperature of the pressure-conveyance media,
      determine the pressure exerted externally on the diaphragm by the process media using the compensated pressure of the pressure-conveyance media,
      determine an indicia representing the pressure exerted externally on the diaphragm by the process media,
      generate a signal representing the indicia, and
      generate a signal representing the pressure exerted externally on the diaphragm by the process media; and
   a visual output device coupled to the microprocessor, the visual output device operable to display the indicia representing the pressure exerted externally on the diaphragm by the process media based on the signal generated by the processor.

2. A system for measuring pressure, the system comprising:
   a seal comprising a diaphragm that is operable to mechanically respond to externally-applied pressure of a process media;
   a pressure-conveyance media at least partially disposed in the seal, the pressure of the pressure-conveyance media responsive to the mechanical response of the diaphragm;
   an electronic pressure sensor coupled to the pressure-conveyance media and operable to sense a pressure of the pressure-conveyance media and to generate a signal representative thereof;
   a temperature sensor coupled to the pressure-conveyance media and operable to sense a temperature of the pressure-conveyance media and to generate a signal representative thereof;
   a microprocessor coupled to the pressure sensor and the temperature sensor, the microprocessor operable to:
      determine the pressure of the pressure-conveyance media based on the signal generated by the pressure sensor,
      determine the temperature of the pressure-conveyance media based on the signal generated by the temperature sensor,
      compensate the pressure of the pressure-conveyance media based on the temperature of the pressure-conveyance media,
      determine the pressure exerted externally on the diaphragm by the process media using the compensated pressure of the pressure-conveyance media,
      determine an indicia representing the pressure exerted externally on the diaphragm by the process media,
      generate a signal representing the indicia, and
      generate a signal representing the pressure exerted externally on the diaphragm by the process media; and
   a remote device coupled to the microprocessor, the remote device operable to monitor the indicia representing the pressure exerted externally on the diaphragm by the process media based on the signal generated by the processor.

3. A system for measuring pressure, the system comprising:
   a seal comprising a diaphragm that is operable to mechanically respond to externally-applied pressure of a process media;
   an pressure-conveyance media at least partially disposed in the seal, the pressure of the pressure-conveyance media responsive to the mechanical response of the diaphragm;
   an electronic pressure sensor coupled to the pressure-conveyance media and operable to sense a pressure of the pressure-conveyance media and to generate a signal representative thereof;
   an electronic temperature sensor coupled to the pressure-conveyance media and operable to sense a temperature of the pressure-conveyance media and to generate a signal representative thereof;
   a microprocessor coupled to the pressure sensor and the temperature sensor, the microprocessor operable to:
      determine the pressure of the pressure-conveyance media based on the signal generated by the pressure sensor,
      determine the temperature of the pressure-conveyance media based on the signal generated by the temperature sensor,
      compensate the pressure of the pressure-conveyance media based on the temperature of the pressure-conveyance media,
      determine the pressure exerted externally on the diaphragm by the process media using the compensated pressure of the pressure-conveyance media,
      determine an indicia representing the pressure exerted externally on the diaphragm by the process media,
      generate a signal representing the indicia, and
      generate a signal representing the pressure exerted externally on the diaphragm by the process media; and a remote device coupled to the microprocessor, the remote device operable to store the indicia representing the pressure exerted externally on the diaphragm by the process media based on the signal generated by the processor.

4. The system for measuring of claim 1 further including a device to store the indicia.

5. The system for measuring of claim 1 further including a device to monitor the indicia.

6. The system for measuring of claim 1 further including a device to store the indicia and monitor the indicia.

7. The system for measuring of claim 2 wherein the remote device operable to monitor the indicia further includes a device to store the indicia.

8. The system for measuring of claim 2 wherein the remote device operable to monitor the indicia further includes a device to visually display the indicia.

9. The system for measuring of claim 2 wherein the remote device operable to monitor the indicia further includes a device to store the indicia and a device to visually display the indicia.

10. The system for measuring of claim 3 wherein the remote device operable to store the indicia further includes a device to monitor the indicia.

11. The system for measuring of claim 3 wherein the remote device operable to store the indicia further includes a device to visually display the indicia.

12. The system for measuring of claim 3 wherein the remote device operable to store the indicia further includes a device to monitor the indicia and a device to visually display the indicia.

* * * * *